United States Patent [19]
Cronce

[11] 4,448,337
[45] May 15, 1984

[54] ARTICLE CARRIER
[75] Inventor: Gary M. Cronce, Port Huron, Mich.
[73] Assignee: Masco Corporation, Taylor, Mich.
[21] Appl. No.: 375,400
[22] Filed: May 6, 1982
[51] Int. Cl.³ .................................................. B60R 9/00
[52] U.S. Cl. ....................................... 224/321; 224/326;
410/105; 410/130
[58] Field of Search ............... 224/321, 320, 322, 324,
224/325, 326, 327; 410/104, 105

[56] References Cited
U.S. PATENT DOCUMENTS

| | | | |
|---|---|---|---|
| 3,554,416 | 1/1971 | Bott | 224/321 |
| 4,109,891 | 8/1978 | Grendahl | 410/105 |
| 4,245,764 | 1/1981 | Kowalski et al. | 224/321 |
| 4,278,376 | 7/1981 | Hunter | 410/130 |
| 4,279,368 | 7/1981 | Kowalski | 224/326 |

Primary Examiner—Steven M. Pollard
Attorney, Agent, or Firm—Steven L. Permut; E. Dennis O'Connor; Leon E. Redmon

[57] ABSTRACT

An article carrier for mounting on a substantially flat surface of a motor vehicle. The article carrier has two parallel slats fixedly secured to the motor vehicle surface in a spaced apart and parallel relationship. Each slat has at least one longitudinal rib. At least one pair of brackets is provided, one of the brackets being fastened to the rib of each of the slats. A locking mechanism depending from the bracket is provided for securing the bracket in a fixed position along the slat by clamping the rib between the bracket and a clamping member. At least one transverse rail is provided, each end of the transverse rail being fastened to one of the brackets.

12 Claims, 6 Drawing Figures

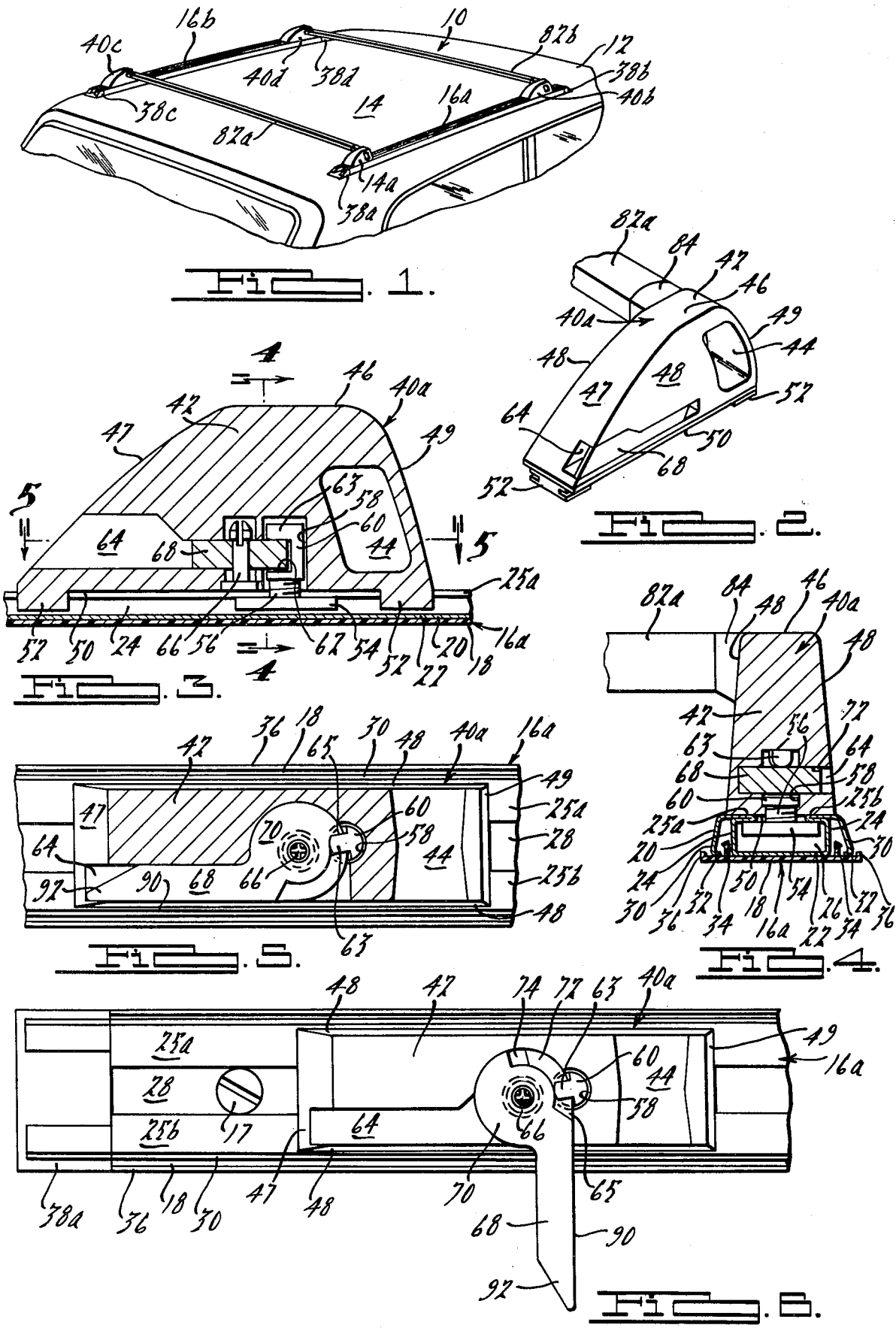

ARTICLE CARRIER

BACKGROUND

The present invention relates to article carriers and more particularly to multiple rail article carriers and to brackets therefore that may be variably positioned.

Luggage racks, ski racks, bicycle carriers and similar article carriers adapted for mounting to the exterior sheet metal of motor vehicles have been disclosed in various forms in the past. One type of article carrier has two or more longitudinal slats fastened to the trunk, roof or a similar flat exterior sheet metal surface of a motor vehicle in a spaced apart and parallel relationship. This type of article carrier has at least one bracket movably fastened to each of the slats. At least one transverse rail is supported above the sheet metal surface with each end of the rail fastened to one of the brackets. Some of the article carriers of this type have movable brackets allowing adjustment of the spacing between a pair of transverse rails. Examples of such article carriers include those disclosed in U.S. Pat. Nos. 3,253,755 (issued May 31, 1966), 3,554,416 (issued Jan. 12, 1971), 4,099,658 (issued July 11, 1978), 4,106,680 (issued Aug. 15, 1978), and 4,132,335 (issued Jan. 2, 1979).

The environment in which article carriers are used is far from ideal. They are subject to vibrations, to moisture, and to a wide range of temperatures. Furthermore, they must endure road dirt and atmospheric contaminants. When an article carrier has movable parts, these environmental conditions become more of a concern since the desired function of the article carrier will be impaired greatly if the movable components do not function properly. Unfortunately, many of the article carriers of the prior art that have movable brackets have bracket components which are exposed to the environment at critical locations.

The article carriers of the prior art have other disadvantages. Some have a large number of bracket components. Others have bracket components, such as threaded members, which are subject to a considerable amount of wear after repeated cycles of use.

It is an object of the present invention to provide an article carrier having a movable bracket comprised of few parts. It is further an object of the present invention to provide a movable bracket for an article carrier which bracket is not susceptible to vibrating loose or becoming loose after repeated cycles of locking and unlocking. It is a still further object of the present invention to provide a movable bracket for an article carrier that permits rapid removal of the bracket and thereby the transverse rail supported by the bracket when the article carrier is not in use. Finally, it is an object of the present invention to provide a movable bracket for an article carrier which bracket may be reliably locked in position with a minimum amount of effort by the user.

SUMMARY

The present invention provides an article carrier for mounting on a exterior surface of a motor vehicle. The article carrier has at least two slats or slat assemblies fixedly secured to the surface in a spaced apart, parallel relationship. Each slat assembly extends longitudinally of the motor vehicle along the surface. Each of the slat assemblies has at least one longitudinal rib means. One or more brackets are disposed adjacent to the rib means of each slat assembly.

Selectively operable clamping means are provided for each bracket to fasten the bracket to the rib means. A lever is pivotally fastened to the bracket. The lever is selectively operable to draw the clamping means against the rib means by means of a camming action between the lever and the clamping means.

One or more transverse rails are provided, each rail being supported by two of the brackets. The rails are mounted parallel to each other, perpendicular to the slat assemblies, and above the surface.

BRIEF DESCRIPTION OF THE DRAWING

FIG. 1 is an perspective view of the preferred embodiment of the article carrier of the present invention affixed to the roof of a motor vehicle;

FIG. 2 is an enlarged perspective view of a portion of the article carrier of FIG. 1 showing one bracket and a portion of one rail;

FIG. 3 is a vertical sectional view taken through one of the brackets and one of the slat assemblies of FIG. 1;

FIG. 4 is a sectional view taken along line 4—4 of FIG. 3;

FIG. 5 is a sectional view taken along line 5—5 of FIG. 3 and showing the bracket in the locked, movement preventing position; and FIG. 6 is a view similar to FIG. 5 but showing the toggle arm of the bracket in the unlocked, movement permitting position as well as adjacent slat assembly structure.

DETAILED DESCRIPTION OF THE PREFERRED EMBODIMENT

Referring now to FIG. 1 of the drawing, the numeral 10 denotes the article carrier of the present invention mounted on a suitable exterior sheet metal surface of a motor vehicle 12. In the illustrations, it is shown mounted on the roof 14 of the motor vehicle 12. The article carrier 10 has two identical slat assemblies 16a and 16b. The slat assemblies 16a and 16b extend longitudinally of the vehicle 12 and are fastened thereto in a spaced apart, parallel relationship by screws 17, one of which is illustrated in FIG. 6.

The slat assembly 16a has a substantially flat lower member or runner 18 and an upper member or track 20, best shown in FIG. 4. The runner 18 is provided to protect the painted surface of the roof 14 from being scratched by the track 20. The runner 18 is formed of plastic or any other suitable material and may be extruded into the desired shape.

The track 20 is formed from a single sheet metal stamping of roll formed steel. The track 20 has an upwardly oriented "C"-shaped cross section. The track 20 has a substantially flat longitudinally extending central portion or base 22 resting upon the runner 18. Two inner webs 24 are provided. Each inner web 24 extends upwardly from one of the side edges of the base 22.

The track 20 includes a pair of coplanar longitudinally extending ribs 25 each extending from one of the inner webs 24. Each of the ribs 25 comprises a lower horizontal portion of sheet metal extending inwardly from the upper end of one of the inner webs 24 and an upper horizontal portion of sheet metal bent back over the lower portion, as shown in FIG. 4. A longitudinal slideway cavity 26, surrounded by base 22, the inner webs 24 and the ribs 25, is formed in the track 20. A longitudinal gap 28 (FIGS. 5 and 6) between the ribs 25 provides access to the slideway cavity 26.

The track 20 further includes an outer web 30 extending downwardly from the outer edge of the upper horizontal portions of each of the ribs 25. As shown in FIG. 4, an inwardly extending longitudinal flange 32 is formed at each of the edges of the sheet metal of the track 20 at the lower end of each outer web 30. Each of the flanges 32 extends inwardly toward the center of the base portion 22 of the track. Each of the flanges 32 cooperate with a pair of longitudinal flanges 34 and 36 of the runner 18 to loosely secure the members 18 and 20 together.

As seen in FIG. 1, four end caps 38a, 38b, 38c, and 38d are provided. The end caps 38a through 38d are not shown in detail and form no part of the present invention but are included in the preferred embodiment. Each end cap 38a through 38d is attached to one end of one of the slat assemblies 16a and 16b. The end caps 38a through 38d reduce the wind noise when the vehicle 12 is in motion and have aesthetic value.

Two brackets 40a and 40b are positioned along the track 20 of the slat assembly 16a, as shown in FIG. 1. Two brackets 40c and 40d are positioned along the track 20 of the slat assembly 16b. The brackets 40c and 40d are identical to the brackets 40a and 40b except that the brackets 40c and 40d are mirror images of the brackets 40a and 40b.

The structure of the bracket 40a may be seen with reference to FIGS. 2 through 6. The bracket 40a comprises a main body 42 located above the track 20. A tie ring aperture 44 is provided transversely through the main body 42 of the bracket 40a. The tie ring aperture 44 is for tie ropes and cords to secure parcels to the article carrier. The main body 42 is preferably a unitary plastic molding. Alternatively, the main body 42 is a metallic die casting.

The main body 42 has a flat top surface 46, a flat front surface 47, two curved side surfaces 48, a flat back surface 49, and a flat base 50. The base 50 is located above the upper portion 29 of the ribs 25. The specific exterior geometric shape and the contours of the top surface 46, the front surface 47, the side surfaces 48 and the back surface 49 of the main body 42 are matters of design preference and have only ornamental significance.

A pair of small "I"-shaped tabs 52 (FIGS. 2 and 3) extends downwardly from the base 50 of main body 42. Each of the tabs 52 extends downwardly from the main body 42. The central portion of the tab 52 is located in the gap 28 between the ribs 25. The upper enlarged portion of the tab 52 rests on the upper surfaces of the ribs 25. The lower enlarged portion of the tab 52 is disposed within the slideway cavity 26 beneath the ribs 25. The tabs 52 keep the bracket 40a aligned with the track 20. The bracket 40a may slide along the track 20 to any desired position. The bracket 40a may be removed from the track 16a only at the ends of the track.

A selectively operable clamping assembly is provided to selectively secure the bracket main body 42 in place once it has been moved to the desired position along the track 20. The clamping assembly includes a clamping plate 54 (FIGS. 3 and 4). In the preferred embodiment, the clamping plate 54 is a rectangular metallic plate having serrations on two of its ends. The lower surface of each of the ribs 25 of the track 20 is also serrated. When the clamping plate 54 is clamped against the ribs 25 in a manner described below, the serrated surfaces of the ribs cooperate with the serrated ends of the clamping plate to prevent movement of the clamping plate 54 along the track 20.

The clamping assembly further includes a pin 60 (FIGS. 3 and 4). The pin 60 is preferably stainless steel. The pin 60 is disposed partly within a vertical bore 58 in the main body 42 of the bracket 40a. The pin 60 extends downwardly from the bore 58 into the slideway cavity 26 of the track 20 and reciprocates within the bore 58. The end 50 of the pin 60 that is within the longitudinal slideway cavity 26 is provided with an external thread. The clamping plate 54 is fastened to the threaded end 56.

The end of the pin 60 furthest from the clamping plate 54 is provided with a horizontal slot 62 (FIG. 3) and an extension 63 thereabove. A pair of small vertical cutaways 65 are provided above the slot 62 on either side of the extension 63.

A longitudinal slot or cavity 64 (FIGS. 3 through 6) is provided in the side of the main body 42. The cavity 64 is adjacent to and partly opened to the bore 58. A pin 66 is mounted vertically to the main body 42 and spaced from pin 60. The pin 66 passes transversely through the cavity 64.

A lever 68 is pivotally mounted to the pin 66. The lever is therefore partially disposed within the cavity 64. The portion of the lever 68 that is centered on the pin 66 is a horizontally disposed disk 70, as best shown in FIGS. 5 and 6. An edge of the disk 70 is disposed within the slot 62 of the tensioning member 61, as shown in FIG. 3. The upper side of the disk 70 is provided with a arcuate ramp 72 (FIGS. 5 and 6) at its outer periphery. The ramp 72 is provided with a detent 74 at the highest end of the ramp. An arm 78 extends from the disk 70 of the lever 68 to permit manual operation of the lever.

A pair of transverse rails 82a and 82b as best shown at FIG. 1, extend transversely between the upper portions of the brackets 40a and 40c and between the brackets 40b and 40c, respectively. Each rail 82a and 82b has a flattened tubular shape. The end of each rail 82a is fastened to a bracket 40a through 40d by means of horn 84 (FIGS. 2 and 4) extending from the upper portion of the main body 42. The details of the construction of the rails 82a and 82b and of the fastening means for the rails are not illustrated but are well known in the art. Furthermore, the details of the rails 82a and 82b and of the fastening means for the rails are not a part of the present invention.

The transverse rails may be moved closer together or farther apart depending on the size of the article carried. The transverse rails 82a and 82b are easily adjusted in position and resecured to the tracks 20 by means of the clamping assemblies of the brackets. The adjustment of the transverse rails is best understood with reference to FIGS. 5 and 6 of the drawing. FIG. 5 illustrates the bracket 40a in the locked position. FIG. 6 illustrates the bracket 40a in the unlocked position.

In the locked position shown in FIG. 5, the lever 68 is entirely within the cavity 64. The detent 74 (FIG. 6) of the ramp 72 is within the slot 62 of the tensioning element 60. The depth of the detent 74 is sufficient to prevent undesired movement between the lever 68 and the tensioning element 60. A small exertion is required to move the lever 68.

As seen in FIG. 5, the lever 68 is entirely within the cavity 64 in the locked position. The outer side 90 of the lever 68 is preferably flush with the sides 48 of the bracket 40a. The end 92 of the arm 78 is easily reached for operation of the lever 68.

When the lever 68 is pivoted a quarter turn from the position shown in FIG. 5 to the position shown in FIG. 6, the lever 68 substantially exits the cavity 64 and is positioned generally transverse to its closed position shown in FIG. 5; and the pin 60 is allowed to descend due to the camming action of the ramp 72. When the lever 68 is in the position shown in FIG. 6, the clamping plate 54 is no longer held against the ribs 25. The bracket 40a may be freely moved along the track 20.

It should be noted that the clamping plate 54 may be flexible. If a flexible plate 54 is used, it will act as a spring in response to the camming action of the lever 68. This reduces the wear on the other components. Particularly, this reduces the wear on the lower surface 98 of the cavity 64 and the wear on the ramp 72.

As is readily apparent from the above description, the present article carrier has a small number of components that may be rapidly and easily assembled and attached to motor vehicles. The brackets are not easily vibrated loose. None of the components, such as the lever 68, the clamping plate 54, the pin 60 and the main body 42 are directly exposed to the environment at any critical locations. The clamping means allows rapid adjustment of the positioning of the rails. Additional rails may be added as needed. Furthermore, when the article carrier is not in use, the transverse rails and the brackets may be easily removed to prevent damage or theft. Removal of the transverse rails reduces the wind noise inherently associated with some article carriers and reduces the air resistance that tends to affect fuel mileage adversely.

The above constitutes a detailed description of the preferred embodiment of the present invention. The above description is provided by way of example and not by way of limitation. Obvious modifications may be made within the scope of the appended claims.

What is claimed as novel is as follows:

1. An article carrier for fastening to an exterior surface of a motor vehicle, said article carrier comprising a pair of longitudinal tracks fastened to said surface in a spaced apart, parallel relationship, a bracket fastened to each of said tracks, and a cross rail fastened between said brackets; wherein said bracket comprises a main body reciprocal fastening means selectively reciprocable to a clamped position securing said main body to said track, and driving means pivotally fastened to said main body for pivotable movement about a vertical axis spaced from said reciprocal fastening means and selectively operable to reciprocate said fastening means to said clamped position and to secure said fastening means in said clamping position, said driving means has a ramp surface in sliding engagement with a surface of said reciprocal fastening means, said ramp surface biasing said fastening means into said clamping position in one orientation of said driving means.

2. An article carrier for fastening to an exterior surface of a motor vehicle, said article carrier comprising a track having a longitudinal base portion, a longitudinal web portion extending from each of the two edges of the base portion, and a pair of coplanar inwardly oriented longitudinal ribs, one rib extending from each of said web portions; a bracket disposed at least partly outside of said track; a clamping plate disposed within said track; a pin fastened to said clamping plate and extending from said clamping plate into a bore in said bracket; and a lever pivotally mounted to said bracket for pivotable movement about a vertical axis spaced from said pin; said lever being selectively operable to pull said pin through said bore and thereby clamp said ribs between said clamping plate and said bracket, a slot in said pin and an arcuate ramp portion on an outer periphery of said lever wherein said lever is pivotally mounted to said bracket such as to pivot about an axis vertically perpendicular to said track and wherein a part of said ramp portion of said lever is inserted into said slot, said ramp portion having a ramp surface sliding contact with the surface of the slot, said ramp biasing said clamping plate against said ribs in one orientation of said lever.

3. The article carrier of claim 2 wherein said lever pulls said pin by means of a slot in said pin, a portion of said lever being inserted into said slot.

4. An article carrier for mounting on an exterior surface of a motor vehicle, said article carrier comprising a pair of spaced apart parallel longitudinal slats fastened to said surface, each of said slats having a longitudinal C-shaped track, a bracket disposed at least partly outside of said track, a clamping plate disposed within said track, reciprocal means fastened to said clamping plate and extending out of said track into a bore within said bracket, said reciprocal means comprises a pin having a slot cut therein, and driving means pivotally fastened to said bracket for pivotable movement about a vertical axis spaced from said pin and having a surface thereof in contact with a surface of said pin, said surface of said pin being an inner surface of said slot, and said driving means selectively pivotable to pull said reciprocal means through said bore and thereby to clamp said bracket to said track.

5. The article carrier of claim 4 wherein said driving means comprises a lever mounted so as to pivot about an axis parallel to the longitudinal axis of said pin and wherein said surface of said driving means is an arcuate ramp and being in sliding contact with said surface of said pin.

6. The article carrier of claim 5 wherein said lever is pivotable into and partly out of a cavity in said bracket.

7. An article carrier for fastening to an exterior surface of a motor vehicle, said article carrier characterized by:
   a track having a longitudinal base portion, a longitudinal web portion extending from each of two edges of the base portion and a pair of coplanar inner oriented longitudinal ribs, one rib extending from each of said web portions;
   a bracket fastened to said track;
   a clamping plate disposed within said track; and
   a lever pivotally mounted to said bracket about a vertical axis with said lever being operably connected to said clamping plate to pull said plate toward said ribs thereby clamping said ribs between said clamping plate and said bracket, said lever being generally disposed outside a cavity within said bracket when said lever is in an open position and being generally disposed within said cavity when said lever is in a position to clamp said clamping plate against said ribs.

8. An article carrier as defined in claim 7 wherein when said lever is in an open position, it is disposed generally transverse to its position to clamp said clamping plate against said ribs.

9. An article carrier as defined in claim 2 wherein said lever pivots approximately a quarter turn from a full closed position to a full open position.

10. An article carrier as defined in claim 2 wherein when said lever is an open position, it is disposed generally tranverse to its closed position.

11. An article carrier as defined in claim 10 wherein said lever is generally disposed outside of the cavity within said bracket when said lever is in the open position and is generally disposed within said cavity when said lever is in said closed position.

12. An article carrier as defined in claim 1 wherein said drive means pivots approximately a quarter turn from a full closed position to a full open position.

* * * * *